United States Patent Office 2,845,402
Patented July 29, 1958

2,845,402

WATER-SOLUBLE POLYESTERS CURABLE TO INSOLUBLE POLYMERS

Howard C. Woodruff, Latham, N. Y., assignor to General Electric Company, a corporation of New York No Drawing. Application December 28, 1953
Serial No. 400,753

11 Claims. (Cl. 260—75)

This invention relates to water-soluble polyesters and to water-insoluble polymers derived therefrom upon curing.

It is known (see, for example, Bradley Patent 2,166,542) that water-soluble polyesters can be prepared from polyethylene glycols and unsaturated dibasic acids. Polymers of these polyesters, however, have the disadvantage of curing to a tacky surface rather than to a desirable non-tacky surface. Additionally, the polyethylene glycols have the inherent disadvantage of possessing only two hydroxyl groups, as a result of which the polyesters derivable from these polyethylene glycols are, except for cross-linking at unsaturated double bonds, linear in nature, and their cured masses are rubber-like, rather than tough, horn-like masses. Since the horn-like masses are to be desired for many end uses, the products derived from polyethylene glycols and unsaturated dibasic acids are not entirely satisfactory for practical commercial purposes.

It has now been found, unexpectedly, that water-soluble polyesters which are capable of curing to infusible, non-tacky, substantially water-insoluble masses, which masses are very tough and horn-like, may be advantageously prepared by the esterification of dibasic acids with a class of alcohols which I have termed "randox polyhydric alcohols." The term "randox polyhydric alcohol" defines herein as inclusive those polyhydric alcohols which are obtained as a result of condensing a base polyhydric alcohol such as pentaerythritol, inositol, sorbitol, enneahepatite, erythritol, etc. with more than one molar equivalent of ethylene oxide. Randox polyhydric alcohols prepared in this manner possess both ether and hydroxyl groups, and at least one ether oxygen separated from a hydroxyl group by the —CH$_2$—CH$_2$— radical.

The randox polyhydric alcohols used in the process of this invention are specifically designated by the following nomenclature: First, there is placed the name of the basic polyol from which the ethylene oxide derivative is obtained; this is followed by the word "randox" in order to signify the ethylene oxide modification of the base polyol and thereafter an Arabic number is attached. The Arabic number represents the average number of —CH$_2$—CH$_2$—O— groups which are contained in each mol of randox polyhydric alcohol. The randox polyhydric alcohols intended are those derived from non-ether polyols more complex in structure than ethylene glycol. For example, using the above nomenclature, the randox polyhydric alcohol produced by condensing 8 mols of ethylene oxide with one mol of sorbitol would be designated as: Sorbitol randox 8. The term "randox" is not intended to refer to the pattern of distribution of —CH$_2$—CH$_2$—O— groups in the polyhydric alcohol molecule, but to refer only to the presence and number of such groups therein.

Generally, the reaction of ethylene oxide with a polyol may take place under substantially anhydrous conditions. However, it is frequently advantageous to cause the reaction of the polyhydric alcohol to take place with the ethylene oxide in the presence of water. When the randox alcohols are produced in the presence of water, they are mixed with various polyethylene glycols. It is not necessary for the purpose of this invention to isolate the randox polyhydric alcohol from the polyethylene glycols as in particular cases the mixtures may be used to advantage without isolation of the various components. When mixtures of polyethylene glycols and randox polyhydric alcohols are employed, such a mixture may be designated by placing the word "hydra" between the name of the basic polyhydric alcohol and the word "randox." After the word "hydra" there is indicated in Arabic numerals the percent water present in the basic polyhydric alcohol-water mix prior to reaction with ethylene oxide. However, when the word "hydra" appears, the final Arabic number following the word "randox" refers to the number of mols of ethylene with the basic polyhydric alcohol-water mix oxide distributed between both the water and the basic polyhydric. For example, using the above system of nomenclature, the material: Sorbitol hydra 15 randox 8 refers to the product formed by reacting 8 gram mols of ethylene oxide with 182 grams (182 being the molecular weight of sorbitol) of sorbitol-water mixture, said sorbitol-water mixture being 85% sorbitol by weight and 15% water by weight. In situations where polyhydric alcohol and water are reacted with ethylene oxide, and in order to further distinguish the randox polyhydric alcohols which form the basis of the polyesters comprising this present invention, the "diol ratio" may be used as a means of identification. By the term "diol ratio" the ratio of mols of diol to mols of randox polyhydric alcohols is specified. This diol ratio may be calculated as follows:

$$\text{Diol ratio} = \frac{(A-B)-C(B+44N)}{18(1-A)}$$

where:

$A$ = percent water in polyol before reaction with ethylene oxide divided by 100.
$B$ = grams of basic polyhydric alcohol considered.
$C$ = percent water in reaction product divided by 100.
$N$ = randox number = number of mols of ethylene oxide reacted with B.

In the case of sorbitol hydra 15 randox 8 where 0.5% water remains in the reaction product, the diol ratio of 1.61 is obtained as follows:

$$\text{Diol ratio} = \frac{(.150)(182)-.005(182+8\times44)}{18\times.85} = 1.61$$

Randox polyols found eminently suitable in the process of this invention possess the unique advantage of having a plurality of ether groups attached to —CH$_2$—CH$_2$— groups and at the same time making it possible for the existence of more than two hydroxyl groups. More than two hydroxyl groups in the presence of a plurality of oxygen atoms each attached to a —CH$_2$—CH$_2$— group is especially important in connection with the production of initially water-soluble polyester resins which cure to produce masses that are hard, tough, essentially water-insoluble and non-tacky. Accordingly, randox esters containing both polymerizing and non-polymerizing type dibasic acids are distinctly different from the corresponding polyethylene glycol esters. In copending application, Serial No. 400,755, filed concurrently herewith and assigned to the assignee of the present invention, it is disclosed that polyethylene glycols produce water-soluble resins when esterified with polymerizing type dibasic acids such as maleic and fumaric. However, when a part of the polymerizing dibasic acid is replaced with a non-polymerizing acid the water-insoluble cured products remain tacky.

Unexpectedly, it has now been found that non-polymerizing type dibasic acids such as phthalic acid, may be used together with polymerizing type dibasic acids without resulting in tacky, cured products to produce products possessing improved hardness and resilience. Thus, it was entirely unexpected that randox polyhydric alcohols when esterified with mixtures of both non-polymerizing and polymerizing dibasic acids would cure to non-tacky masses since this was entirely opposite from what would have been predicted to occur from past experiences with similar esterification products of polyethylene glycols.

The water-soluble polyesters produced by the esterification of randox polyhydric alcohols with mixtures of unsaturated dibasic acids and non-polymerizing dibasic acids in accordance with the process of this invention when cured by the action of heat or free radical catalysts find desirable utility in many industrial applications such as modifying the properties of webs and textiles, for altering the characteristics of paper, for use in printing systems for paper, textiles and plastics, etc. In each of these applications the water-soluble polyesters have the distinct advantage of being transferable to the point of use in a system where the main carrying fluid is water, and after deposition of the resin with suitable modifers into or onto items intended for modification, the proper combination of catalysts or heat and catalysts will cause the resin to cure and become substantially water-insoluble. In an alternative manner, the catalysts may be previously introduced into the water carrying system of water-soluble polyester.

The randox polyhydric alcohols found eminently suitable for the process of this invention lie within the range of randox 3 and randox 30. A particularly advantageous group of randox polyhydric alcohols ranges between randox 8 and randox 20. As the basic polyol to be employed, sorbitol is preferred since it presents the advantage of producing randox derivatives wherein a portion of the randox contains six hydroxyl groups per mol. In this manner, the average hydroxyl functionality of sorbitol randox 8 is 6, and the average hydroxyl functionality of sorbitol hydra 15 randox 8 is 3.7.

The polymerizing dibasic acids found suitable in producing the aforedescribed insoluble polyesters include maleic acid (or anhydride) and fumaric acid and mixtures of these acids.

The preferred non-polymerizing dibasic acids found eminently suitable are phthalic and isophthalic acids since they present the advantage of imparting toughness to the products. Other aromatic acids, for example, tetrahydrophthalic, terephthalic and saturated acids obtained through Diels-Alder condensation of an unsaturated acid and an unsaturated hydrocarbon, i. e., maleic and butadiene or styrene, may also be used. Additionally, oxalic, malonic, succinic, glutaric, adipic, pimelic, azelaic, and sebacic acids and their derivatives, for example, substituted succinic acids, such as butyl succinic acid, may be used to advantage. Essentially, these acids do not contain chain unsaturation.

The process which may be employed in producing products in accordance with this invention may be varied within wide limits. One suitable method of effecting reaction is by the process of fusion of the ingredients. In this process, the ingredients are heated together, preferably in an inert atmosphere, until sufficient synthetic water is evolved and taken off. The finished product is then cooled and is ready for use. As an alternative method, azeotropic distillation of the synthetic water may be effected in the presence of a volatile organic substance capable of forming a suitable azeotrope with the water and dissolving the resin. Entraining agents which may be employed include xylene and benzene as well as others.

As the conclusion of the reaction, when the resin formation takes place in a solvent, it is desirable to remove the solvent by strong blowing with an inert gas or, alternatively, by the application of vacuum.

The proportions of randox polyhydric alcohol found suitable may vary from 0.8 mol to 1.8 mols per each mol of combined saturated and unsaturated acids. The quantity of saturated dibasic acid generally employed may be between 0.4 and 2.0 times the molecular amount of unsaturated dibasic acid used. Stated on a molar basis, for each mol of unsaturated dibasic acid there may be used from 0.4 to 2.0 mols of saturated dibasic acid.

The water-soluble esters produced by this process dissolve readily in water. Suitable catalysts, for example, free radical catalysts and, if desired, accelerators, may be added directly to the water solution of these polyesters. Such a water system presents the major advantage of being transportable as a water system to the point of use where the water is partly or completely removed by suitable means, one means being by simple evaporation into the air at room temperature, and thereafter free radical catalyst causing the curing process to take place by the application of heat.

The free radical catalysts which may be employed in obtaining cured products of this invention are the conventional free radical catalysts generally used. For example, suitable catalysts include hydrogen peroxide, ammonium persulphate, tertiary butyl hydroperoxide, tertiary butyl perphthalic acids, etc.

The water-soluble polyesters produced when operating in the manner described are generally slightly acid in nature and they may be used in the acid condition without the necessity of any solubilizing agents. However, it is also possible to neutralize the solutions of said polyesters with any suitable alkali and, accordingly, the products may be used as neutral, alkaline, or acid solutions. Additionally, suitable filling pigments and/or fibrous materials may be used in conjunction with the polyesters.

In order that those skilled in the art may better understand how the present invention may be carried into effect, the following examples are given by way of illustration and not by way of limitation. All parts are by weight.

*Example 1*

A soluble polyester was prepared by reacting in an agitated reactor equipped with a reflux condenser and a Dean-Stark separatory trap 600 parts of sorbitol hydra 15 randox 8 having a diol ratio of 1.61, 111 parts of maleic anhydride, 75 parts of phthalic anhydride and 60 parts of xylol. This mixture was refluxed continuously at 145–155° C. and synthetic water separated continuously in the trap. When no more water was passed off, the temperature was maintained at 145–155° C. and the reactor was then arranged to provide for distillation. A stream of nitrogen was blown through the contents of the reactor until all the xylol had been removed. The water-soluble polyester produced had the following characteristics:

Acid number_____ 24.5.
Viscosity_____ Z–2 to Z–3.
Water solubility_____ Completely soluble in all proportions.

In order to convert the polyester thus obtained into a cured product, the product of the above example was mixed with water and catalyst in the following proportion:

100 parts by weight of the soluble polyester, 15 parts of water and 2 parts of tertiary butyl perphthalic acid. This soluble resin mix was cured at 150° C. for one-half hour to produce a tough, tack-free, strongly cohesive mass which was substantially insoluble in water.

*Example 2*

Using the procedure described in Example 1, 1290 parts of sorbitol randox 8, 600 parts of sorbitol hydra 15 randox 20, 410 parts of maleic anhydride and 225 parts of fumaric acid were reacted. A water-soluble polyester was produced having the following characteristics: An acid number of 53, a viscosity of Z-2 (85% solids in water), water solubility, completely in all proportions.

The water-soluble polyester of this example was mixed with water and catalyst in the following proportions:

100 parts of polyester product
20 parts of water
2 parts of tertiary butyl hydroperoxide The water was evaporated off at 100° C. and the polyester cured at 150° C. to a tough, cohesive mass which was substantially insoluble in water. This cured product possessed somewhat greater cohesive strength than the product produced in accordance with Example 1.

*Example 3*

Employing the identical process steps of Examples 1 and 2, another water-soluble polyester was prepared by reacting 1290 parts of sorbitol randox 8, 600 parts of sorbitol hydra 15 randox 20, 497 parts of fumaric acid and 225 parts of phthalic anhydride. Water-soluble polyester products so produced had the folowing characteristics:

An acid number of 53, a viscosity of Z-2 (75% solids in water) and water solubility, completely soluble in all proportions. This water-soluble polyester was mixed with water and catalyst in the folowing proportions:

100 parts of polyester, 20 parts of water and 1 part of tertiary butyl perphthalic acid. The water was evaporated off at 100° C. to leave a clear mixture of the polyester which cured at 150° C. to a tough, cohesive mass which was substantially insoluble in water. This cured product possessed greater cohesive strength than the corresponding product produced in accordance with Example 2 and greater than that of Example 1.

The water-soluble polyesters produced in accordance with this invention have a wide field of uses as previously mentioned. For example, they find utility in many industrial applications such as modification of properties of webs and textiles, for altering the characteristics of paper, for use in printing systems suitable for printing on paper, textiles and plastics. They are readily transportable to their point of use in water systems and are readily employed as such. As mentioned previously, they may be catalyzed initially or catalysts may be added just prior to their use. Additionally, they may be modified with various pigments and fillers, and other water-soluble materials such as gum, starches, proteins, wetting agents, etc.

What I claim as new and desire to secure by Letters Patent of the United States is:

1. A process of preparing water-soluble polymerizable polyesters which comprises esterifying in one step at an elevated temperature to a water-soluble acidic polyester (1) one mol of an unsaturated aliphatic compound selected from the group consisting of maleic acid, maleic anhydride, fumaric acid, and mixtures thereof, (2) about 0.4 to 2.0 mols of dicarboxylic acid free of chain unsaturation, and (3) for each mol of combined unsaturated and saturated acid, about 0.8 to 1.8 mols of the product of reaction of one mol of a polyhydric alcohol containing more than two hydroxyl groups and about 3 to 30 mols of ethylene oxide, said reaction product having at least one ether oxygen separated from a hydroxyl group by the —CH$_2$—CH$_2$— radical.

2. The water-soluble polyester prepared in accordance with the process of claim 1.

3. The insoluble product obtained by curing in the presence of heat and a peroxide catalyst the product produced in accordance with the process of claim 1.

4. The process of preparing water-soluble, polymerizable polyesters which comprise esterifying in one step at an elevated temperature to a water-soluble acidic polyester (1) 1 mol of maleic anhydride, (2) about 0.4 to 2.0 mols of phthalic anhydride, and (3) for each mol of combined maleic anhydride and phthalic anhydride, about 0.8 to 1.8 mols of the product of reaction of 8 mols of ethylene oxide with 1 mol of sorbitol containing 15%, by weight, water, said ethylene oxide reaction product having at least one ether oxygen separated from a hydroxyl group by the —CH$_2$CH$_2$— radical.

5. The water-soluble polyester prepared in accordance with the process of claim 4.

6. The insoluble product obtained by curing in the presence of heat and a peroxide catalyst the produce produced in accordance with the process of claim 4.

7. The process of preparing water-soluble polymerizable polyesters which comprises esterifying in one step at an elevated temperature to a water-soluble acidic polyester (1) 1 mol of fumaric acid, (2) about 0.4 to 2.0 mols of phthalic anhydride, (3) the product of reaction of 20 mols of ethylene oxide with one mol of sorbitol containing 15%, by weight, water, and (4) the product of reaction of 1 mol of sorbitol and 8 mols of ethylene oxide, the combined amounts of (3) and (4) being about 0.8 to 1.8 mols, said ethylene oxide reaction products (3) and (4) having at least one ether oxygen separated from a hydroxyl group by the —CH$_2$CH$_2$— radical.

8. A water-soluble polyester prepared in accordance with the process of claim 7.

9. The insoluble product obtained by curing in the presence of heat and a peroxide catalyst the product produced in accordance with the process of claim 7.

10. The resinous ester of an ethylene oxide-polyhydric alcohol reaction product containing unsaturated and saturated acid residues prepared by esterifying in one step at an elevated temperature to a water-soluble acidic polyester (1) the reaction product of one mol of a polyhydric alcohol containing more than 2 hydroxyl groups and about 3 to 30 mols of ethylene oxide, said reaction product having at least one ether oxygen separated from a hydroxyl group by the —CH$_2$CH$_2$— radical, (2) 1 mol of an unsaturated compound selected from the group consisting of maleic acid, maleic anhydride, fumaric acid, and mixtures thereof, and (3) about 0.4 to 2.0 mols of a saturated acid selected from the group consisting of phthalic, isophthalic, and aliphatic dicarboxylic acids containing from 2 to 10 carbon atoms, the amount of ethylene oxide-polyhydric alcohol reaction product being about 0.8 to 1.8 mols for each mol of combined unsaturated and saturated acid.

11. A resinous ester of an ethylene oxide-polyhydric alcohol reaction product obtained by esterifying in one step at an elevated temperature to a water-soluble acidic polyester (1) the reaction product of about 3 to about 30 mols of ethylene oxide with one mol of a member selected from the group consisting of sorbitol, pentaerythritol and inositol, said reaction product having at least one ether oxygen separated from a hydroxyl group by the —CH$_2$CH$_2$— radical, (2) 1 mol of an unsaturated compound selected from the group consisting of maleic acid, maleic anhydride, fumaric acid and mixtures therefor and (3) about 0.4 to 2.0 mols of a saturated acid selected from the group consisting of phthalic, isophthalic, and aliphatic dicarboxylic acids containing from 2 to 10 carbon atoms, the amount of ethylene oxide-polyhydric alcohol reaction product being about 0.8 to 1.8 mols for each mol of combined unsaturated and saturated acid.

References Cited in the file of this patent

UNITED STATES PATENTS

| | | |
|---|---|---|
| 1,922,459 | Schmidt et al. | Aug. 15, 1933 |
| 2,166,542 | Bradley | July 18, 1939 |
| 2,308,494 | D'Alelio | Jan. 19, 1943 |